United States Patent Office 2,767,636
Patented Oct. 23, 1956

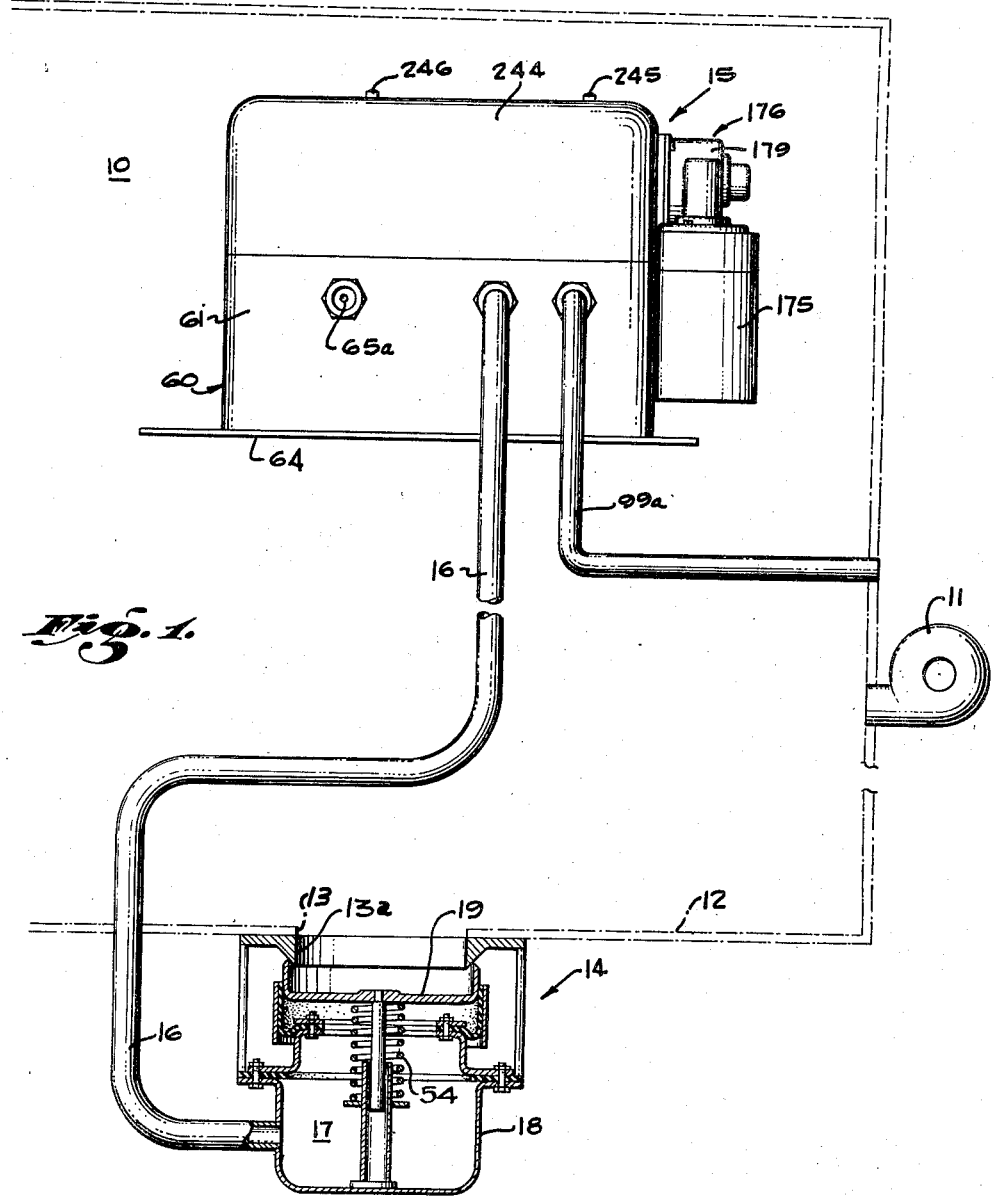

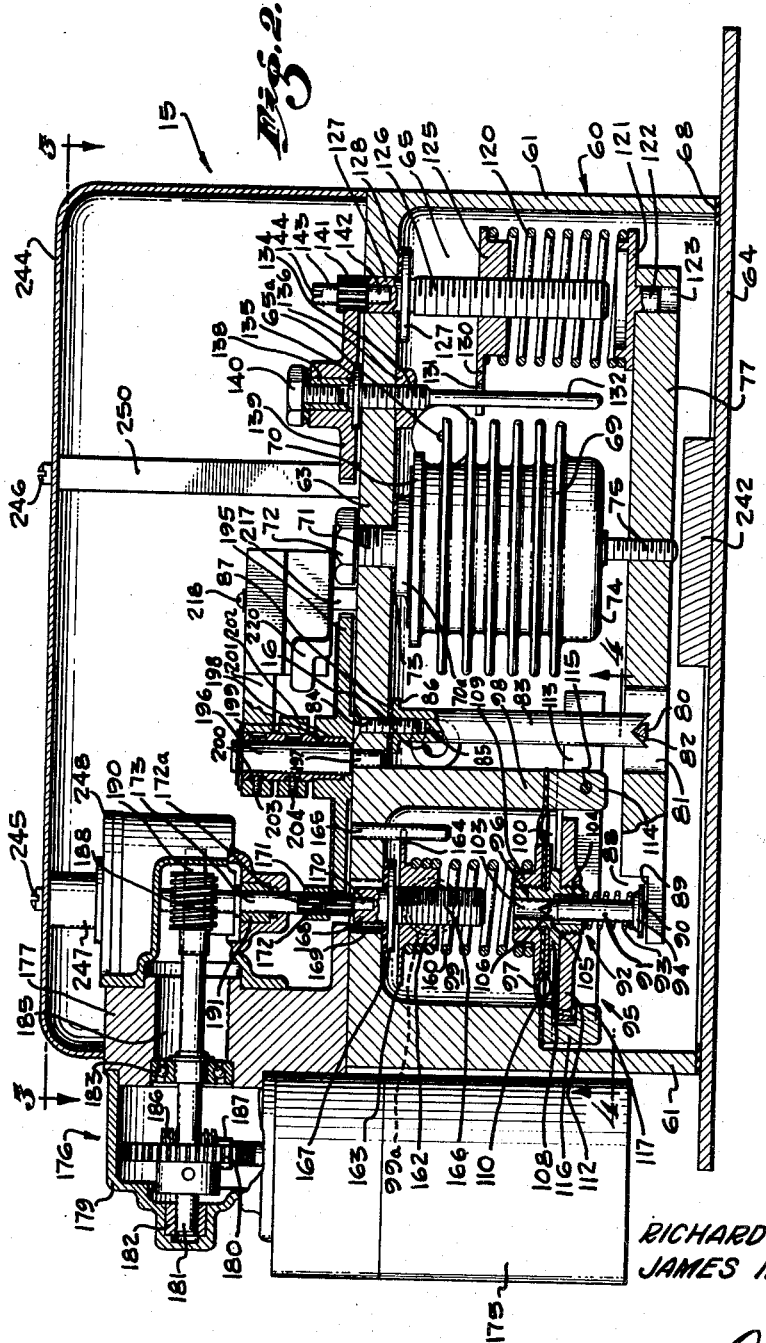

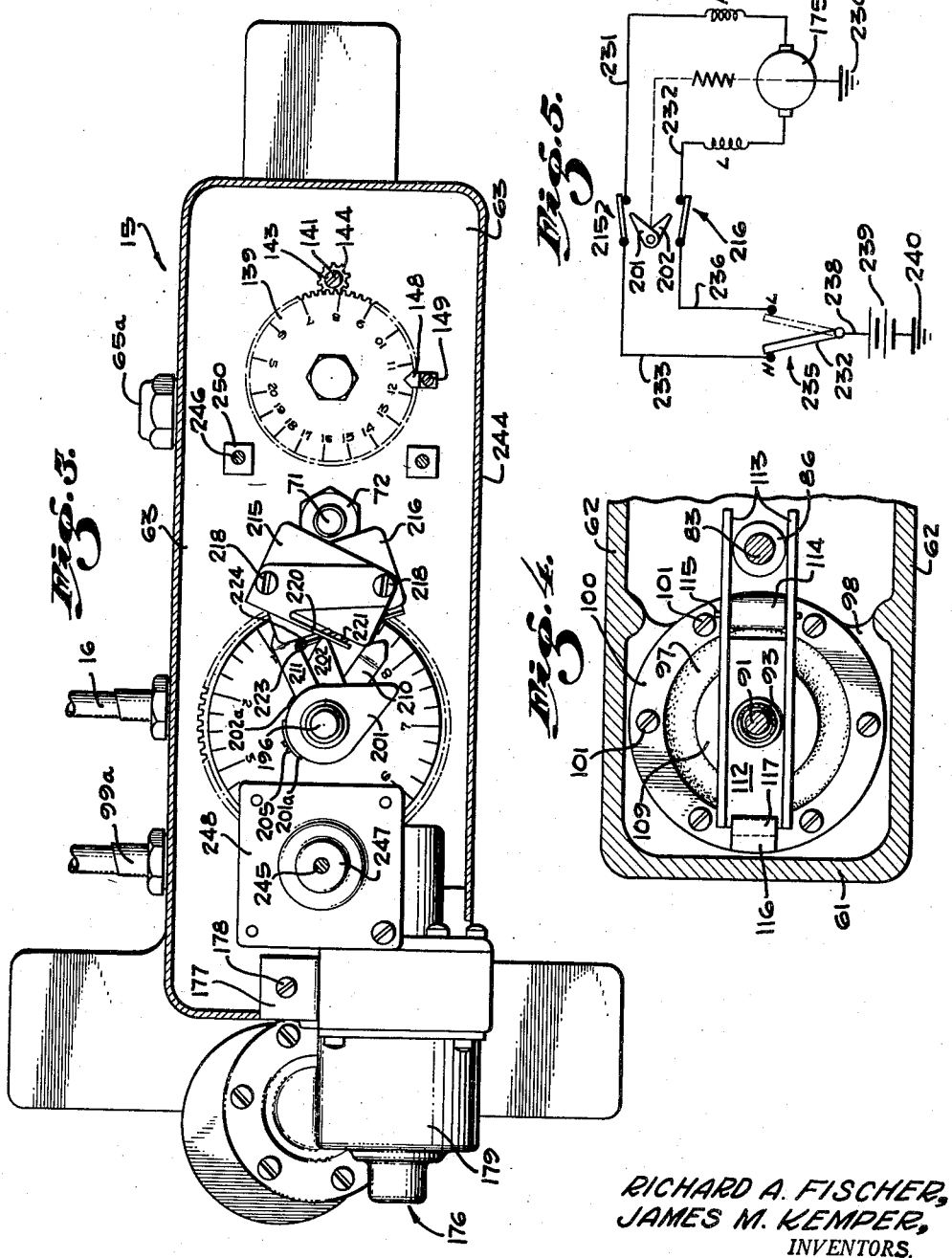

2,767,636
PRESSURE REGULATING MECHANISM

Richard A. Fischer, Los Angeles, and James M. Kemper, Hollywood, Calif., assignors to The Garrett Corporation, Los Angeles, Calif., a corporation of California Application January 2, 1952, Serial No. 264,566

20 Claims. (Cl. 98—1.5)

This invention relates generally to pressure regulating or control means and relates more particularly to means or mechanism for controlling the pressure in enclosures.

While the invention has particular utility in connection with pressurized ventilation of enclosures such as aircraft cabins and the like, and is shown and described embodied in such installations, it is to be understood that its utility is not confined thereto, and it is to be understood that the term "aircraft" as used herein refers to any type of device that travels through the earth's atmosphere. Generally, in cabin pressurizing and ventilating systems, there is means, such as an air pump or supercharger or the like for supplying air under pressure to the cabin, with one or more valves for controlling the outflow of air from a discharge or outlet duct or ducts.

The pressurizing of the cabin is for the purpose of providing adequate air supply under sufficient pressure to prevent discomfort or injury to the occupants of the cabin.

Various cabin pressurizing systems are used for aircraft cabins. In one such system, for example, cabin pressure is permitted to remain substantially the same as ambient atmospheric pressure until a predetermined altitude has been reached and is maintained at a substantially constant pressure between that altitude and a second predetermined higher altitude. Between the second predetermined altitude and a third predetermined higher altitude, the cabin pressure is maintained at a substantially fixed differential relative to external atmosphere. Under normal operating conditions this fixed differential pressure is relatively high and is satisfactory in military aircraft when said aircraft are not in a combat zone.

However, such a relatively high differential pressure for the cabin of military aircraft may be unsuited for combat and may then even be a dangerous hazard to the aircraft personnel. For example, should there be a major perforation in the wall of the pressurized cabin as a result of enemy fire or for any other reason, and said perforation is of such size that air will escape from the cabin faster than the pressurization apparatus can pump fresh air into the cabin to replace it, the cabin pressure may drop to a lower level at a rate of change greater than that at which the occupants can continue to maintain normal and rational physical and mental functioning. In this connection, the magnitude of the change must also be considered and may be an important factor.

Such a substantial drop in pressure is commonly termed explosive decompression and may have serious, if not fatal, effect on the personnel within said cabin.

It is, therefore, an object of the present invention to provide pressure regulating or control mechanism which will most advantageously control the pressure conditions within the cabin under the various conditions which may be encountered in the operation of aircraft, particularly military aircraft.

Another object of the invention is to provide mechanism of this character that utilizes a single metering valve for controlling the flow of air relative to the control pressure chamber.

Still another object of the invention is to provide mechanism of this character that is relatively simple in construction.

It is a further object of the invention to provide mechanism of this character that includes a relatively simple and effective form of differential change and rate mechanism.

A still further object of the invention is to provide mechanism of this character that is extremely compact.

It is another object of the invention to provide mechanism of this character that is effective and reliable in operation.

Still another object of the invention is to provide mechanism of this character that is extremely light in weight.

A further object of the invention is to provide means of this character that is relatively inexpensive to manufacture.

Further objects and advantages of the invention will appear from the following part of the specification.

Referring to the drawings which are for illustrative purposes only:

Fig. 1 is a diagrammatic view showing a cabin having a pressure regulating system including an outflow valve and pressure regulating unit for said valve;

Fig. 2 is an enlarged sectional view of the regulating unit;

Fig. 3 is a sectional view taken on line 3—3 of Fig. 2;

Fig. 4 is a sectional view taken on line 4—4 of Fig. 2; and

Fig. 5 is a wiring diagram of the electrical system for the present invention.

Referring to Fig. 1, there is shown a diagrammatic or schematic representation of a cabin pressure control system in which a pressure regulating or control mechanism embodying the present invention constitutes a component.

Enclosure or cabin 10 is supplied with air under pressure by any suitable means such as an air pump or supercharger 11, which may be operated by any suitable source of power, not shown, for maintaining a flow of air into the cabin. The cabin includes a wall 12 having an opening 13 which is controlled by an outflow valve mechanism, indicated generally at 14, which is mounted outside the cabin and which is capable of directly controlling the cabin pressure by regulating or controlling the discharge of air from said cabin through the opening 13 to ambient atmosphere. Broadly, the valve mechanism 14 controls the flow of air relative to the enclosure or cabin. Operation of the outflow valve 14 is controlled by a regulating unit, indicated generally at 15, and having a fluid transmitting connection 16 with a control pressure chamber 17 of said valve 14 defined by a cover 18.

This valve 14 includes a valve seat member 13a, surrounding the opening 13, and a movable valve member 19 acted upon by cabin pressure on one of its sides and by the pressure in the control chamber 17 upon its other side. The control pressure of the unit 15, as hereinafter described, is transmitted through the conduit 16 to the control pressure chamber 17 of the outflow valve 14 so that the valve 19 is positioned in accordance with the differential pressure on opposite sides thereof and variations in either cabin pressure or control chamber pressure will effect actuation and positioning of the valve 19 to variably control the outflow of air through the opening 13 of the cabin. A more detailed description of this outflow valve 14 is not given inasmuch as the particular type of valve used does not constitute a part of the present invention as any suitable type of outflow valve may be used and controlled by the present regulator.

Referring now to Figs. 2, 3 and 4, the pressure control unit 15 comprises a housing, indicated generally at 60, having end walls 61, side walls 62 which, together with the removable plate 64, define a control pressure chamber 65 connected with the cabin by means of a calibrated bleed orifice 65a. The plate 64 is secured by any suitable means such as screws, not shown, and there is a gasket 68 between the free edges of the side and end walls of the housing and the plate 64.

Within the chamber 65 there is disposed absolute pressure responsive means shown as an evacuated bellows 69 having a plate 70 at one end from which a threaded stud 71 extends through an opening provided therefor in the wall 63, said stud being secured by means of a nut 72, there being a sealing gasket 73 about the stud and between the portion 70a of the plate 70 and the wall 63. The other end of bellows 69 has a movable wall 74 and has one end of a screw 75 secured thereto, said screw being threadably received in a tapped opening provided therefor in a rocker arm 77 intermediate the ends thereof.

Rocker arm 77 has a fulcrum between the point of attachment of screw 75 and one end and the fulcrum means includes a knife-edged fulcrum member 80 extending transversely across an opening 81 in the rocker arm 77, the ends of said member being secured in the arm 77 at diametrically opposite sides of said opening 81. The fulcrum member 80 is operably disposed in a notch 82 at the adjacent free end of a support member or pedestal 83 which has its opposite end secured to the wall 63 by means of a screw 84 extending through an opening provided therefor in said wall 63 and threaded into a tapped opening 85 in the adjacent end of the pedestal 83. The pedestal, at its attached end, has a radially extending flange 86 and there is a sealing washer 87 on the crew 84 between the flange 86 and wall 63.

Outwardly of the pivotal means of the rocker arm 77, said arm is notched at 88 and the surface 89 of said notch, which extends longitudinally with respect to the rocker arm 77, engages the outer end 90 of a metering pin 91 of a metering valve, indicated generally at 92, said pin 91 being urged into engagement with said rocker arm by a spring 93 reacting between an enlarged head 94 of said valve pin and the adjacent end of the valve seat member 96. The metering valve 92 controls the flow of air relative to the chamber 65 and more particularly controls the outflow of such air. This metering valve is under the control of a differential pressure responsive mechanism indicated generally at 95, as well as the absolute pressure responsive mechanism. The latter controls the movable metering pin 91 and the differential pressure responsive mechanism controls a valve seat member 96 carried by a diaphragm 97 having a marginal edge portion secured between the free edge of the walls 98 which define a chamber 99 and a diaphragm retaining ring 100 which is secured to the walls 98 by means of screws 101, Fig. 4. Chamber 99 is connected with atmosphere by means of a conduit 99a.

The seat member 96 has a passage 103 therein which is enlarged at 104 so as to form a seat 105 cooperable with the tapered point 106 of the valve member 91 which is received in the enlarged portion 104 of the passage through the seat member. The seat member has an annular flange 108 on one side of the diaphragm 97 and at the opposite side said seat member is externally threaded for reception of a clamping member 109, there being a plate 110 between the flange 108 and the diaphragm. The plate 110 and the clamping member 109 are of smaller diameter than the diameter of chamber 99 so as to permit operable flexing of the diaphragm 97. The flanged end of the seat member 96 is threaded for reception of a lever 112 which has a tapped opening intermediate the ends thereof. The lever 112 has side members 113 which straddle a lug 114 on the ring 100, said lever being pivoted on a pin 115 which extends through the lug 114 and the arms 113. Diametrically opposite the lug 114, the ring 100 is provided with an outwardly extending portion 116 having a lateral extension 117 spaced from the ring overlying the adjacent free end of the lever 112 so as to limit movement of said lever outwardly with respect to the chamber 99 thereby limiting movement of the valve seat member 96. Inward movement of the lever 112 is limited by engagement with the ring 100 so that the free end of said lever has limited movement which is effected by variations in the differential of pressure across the diaphragm 97.

Means for effecting loading of the absolute pressure responsive means comprises a compression spring 120 effective against the end of the rocker arm 77 opposite the valve member 91. The spring 120 reacts between a spring retainer 121 having an integral pin 122 received in an opening 123 in the said end of arms 77 and a second spring retainer 125 threadably received on a screw 126 having an end 127 rotatable in an opening provided therefor in the wall 63. The screw 126 is provided with a flange 127 adjacent the journaled end for limiting movement of said screw upwardly, as viewed in Fig. 2, and a sealing washer 128 is provided between the flange 127 and the adjacent surface of wall 63. Rotation of the spring retainer 125 is prevented by an extension 130 having a notch 131 therein for slidable reception of a post 132. The post 132, which serves as stop means for limiting counterclockwise movement of the rocker arm 77, has an enlarged threaded end 134 received in an opening provided therefor in the wall 63 and is provided with a flange 135 adjacent to the outer end thereof and is secured by a nut 136 on the side of the wall 63 opposite the flange 135 which is at the outer side of said wall.

Extending outwardly of the flange 135 is an extension 138 on which is rotatably mounted a gear 139 which is secured on the extension 138 by a bolt or screw 140. The gear 139 meshes with a pinion 141 having axial extensions 142 and 143. The extension 142 is secured in a bore provided therefor in the adjacent end of the portion 127 of screw 126 and the extension 143 is provided with a slot 144 for reception of a screw driver or any other suitable instrument for rotating the screw 126 to thereby vary the force of spring 120 effective against the adjacent end of the rocker arm 77. Rotation of the gear 141 and screw 126 effects rotation of the gear 139 which is provided with a series of annularly spaced marks with indicia therefor, as best shown in Fig. 3. There is a pointer 148 having a part overlying the peripheral area of the gear 139, said pointer being secured to the wall 63 by means of a screw 149. Rotation of the gear 139 brings the various spaced markings on said gear into register with the pointer 148 which thereby indicates pressure level of the isobaric range.

Loading of the diaphragm 97 of the differential control is effected by a spring 160 within the chamber 99. One end of spring 160 engages the clamping member 109 which serves also as a spring retainer and the opposite end of said spring is attached to a spring retainer 162 which is externally threaded for reception of several end coils of the spring and which has a flange 163 adjacent one end, said flange having a notch 164 slidably receiving a pin 165 press-fitted into an opening provided therefor in the wall 63. The pin 165 permits longitudinal movement of the retainer 162 but prevents rotation thereof. Retainer 162 has an axial tapped bore threaded on to an adjusting screw 166 whereby the effective force of spring 160 on the diaphragm 97 may be varied. Screw 166 has a flange 167 adjacent the outer end, a portion 168 of which is received in an opening 169 in the wall 63, there being a seal 170 on the screw between the flange 167 and the wall 63 to seal said opening 169. End portion 168 is provided with an axial bore in which is press-fitted or otherwise suitably secured, an end shaft 171 of a gear or pinion 172 connected by a coupling 172a to a shaft 173 adapted to be rotated by a motor 175 through a gear system, indicated generally at 176, said motor being adapted to operate at a substantially constant speed. This gear system is contained in a gear housing including a housing section 177 having flanges 178 whereby said section 177 is secured to the wall 63 by screws 178. The gear housing includes an outer end section 179 in which is disposed a gear 180 on a shaft 181 having its outer end rotatably mounted in a bushing 182 and having a roller bearing 183 intermediate the ends of said shaft. The other end of said shaft 181 is also mounted in a bearing, not shown, said shaft passing through an opening 185 in the central section 177. Gear 180 is driven by a worm gear 186 on motor shaft 187 and there is a worm gear 188 adjacent the other end of said shaft for driving a gear 190 at the upper end of shaft 173, as best shown in Fig. 2. It is to be noted that shaft 173 is operably mounted in the bushing 191.

Pinion 172 is meshed with a gear 195 rotatable on a shaft 196 having a reduced end portion 197 press-fitted or otherwise suitably secured in an opening provided therefor in wall 63, said shaft 196 extending outwardly of said wall. The gear 195 has an axial opening 198 which is larger in diameter than the diameter of shaft 196 for reception of a reduced end portion 199 of a sleeve 200 which is rotatable on said shaft 196. Sleeve 200 extends outwardly of gear 195 and carries a pair of cams 201 and 202 secured to said sleeve by screws 203 and 204. Beneath the respective cams are pointers 210 and 211 respectively which point to pressure differential indicia 212 arranged adjacent the periphery of said gear 195 and annularly spaced apart with numbers indicating various pressures. Each of the pointers has a portion with an opening (not shown) which receives the shaft 196 and one end portion 201a and 202a respectively turned alongside the respective cams and secured thereto by screws 205. The cams 201 and 202 are manually adjustable on the shaft 196 and the respective pointers 210 and 211 rotate with their respective cams so that the low and high differential pressures may be determined by the proper adjustment of said cams as indicated by their respective pointers. Cams 201 and 202 are arranged to actuate respective micro-switches 215 and 216. These switches are limit switches and are mounted on posts 217 by means of screws 218, the switch 215 being above the switch 216. Switch 215 is provided with a resilient arm 220 which extends along one side and which is so located as to be engaged and actuated by the cam 201 which, as said cam rotates, engages said arm 220 and urges same away from the cam so as to actuate a plunger 221 of switch 215 to thereby open said switch which is normally closed. Switch 216 is also a normally closed switch and includes a resilient arm 223 which actuates a plunger 224 when the arm 223 is engaged and actuated by cam 202.

Referring to Fig. 5, which shows the electrical system, motor 175 is grounded at 230 and has a coil R connected with the switch 215 by wire 231 and a coil L connected with the switch 216 by a wire 232. Switch 215 is connected by a wire 233 to a fixed terminal H of a cockpit selector switch, indicated generally at 235, and switch 216 is connected by a wire 236 with a fixed contact L of said cockpit selector switch. Switch 235 has a contact member 237 movable between the fixed contacts H and L and said movable contact 232 has a connection 238 with a source of electric supply, indicated such as a battery 239, which, in turn, is grounded at 240.

Assuming the aircraft is on the ground at an altitude below that set for the isobaric pressure level in the cabin and said aircraft takes off and ascends, the pressure in the aircraft cabin will be substantially the same as ambient atmospheric pressure due to the fact that the pin 91 is off the seat 105. The air bled into the chamber 65 through the orifice 65a escapes through the metering valve 92 into the chamber 99, and, hence, to atmosphere by way of the passage 99a and the escape of said chamber air is at a sufficiently rapid rate so that chamber pressure will be substantially the same as atmospheric pressure. Inasmuch as the pressure in the chamber 65 is substantially atmospheric pressure, the pressure in chamber 17 of the outflow valve will be substantially atmospheric pressure because of the connection 16 so that broadly the chambers 65 and 17 and the conduit 16 can be considered a control pressure chamber. Actually cabin pressure will be slightly above atmospheric pressure in the range up to the isobaric range, said cabin pressure being above atmospheric pressure an amount determined by the effective force of a light spring 54. The range up to the isobaric range may be termed the unpressurized range and as the aircraft climbs in this range, the isobaric bellows 69 expands causing the metering pin 91 to move toward the seat 105 and when the isobaric range is reached, the bellows 69 will so control the metering pin 91 as to maintain a substantially constant pressure level in the chamber 65 and, hence, in the chamber 17, to thereby control the outflow valve so as to maintain a substantially constant pressure level in the cabin.

As the aircraft ascends in the isobaric range, the differential of pressure between that in the chamber 65 and the chamber 99 will increase until the valve seat member 96 will move upwardly, as shown in Fig. 2, away from the metering pin 91 to thereafter control the pressure in the chamber 65 and, hence, in the cabin, at a predetermined fixed differential pressure determined by the effective force of spring 160 on the valve seat member 96. As soon as the differential control becomes effective, the end of the rocker arm 77 having the connection with the bellows 69 will engage a block 242 which is secured to the plate 64 and thereby prevent further expansion of said bellows 69 and thus maintain the metering pin 91 in a fixed position and metering of air from the chamber 65 will be controlled by the positioning of the valve seat 105 by the diaphragm 97.

The differential pressure between that in chamber 65 and atmospheric pressure thus maintained may be called the normal high differential pressure. When it is desired to maintain a low differential pressure, the cockpit selector switch member 232 is moved to the fixed contact member L thereby causing the motor to operate in the proper direction so as to reduce the effective force of spring 160 on the diaphragm 97. As the motor operates, the gear 195 is rotated carrying the cams along until the cam 202 opens the microswitch 216, thereby stopping the operation of the motor 175. Should it be desired to change the differential control from the low differential to the high differential, the switch member 232 is moved into the fixed switch contact H and the motor 175 will be operated in the reverse direction until the cam 201 opens switch 215. The high and low differential pressures are determined by the setting of the cams 201 and 102 and the value of said differential pressures is indicated by the pointers 210 and 211 which point to the respective differential pressures which will be maintained by a given setting of the mechanism.

The mechanism on the outer side of the wall 63 is provided with a cover 244 which is secured in position by screws 245 and 246. The screw 245 is received in an opening provided therefor in the bottom wall of the cover 244 and is screwed into a tapped opening in a boss 247 which extends from a cover plate 248 of the gear housing. The screws 246 are also received in openings provided therefor in the bottom wall of the cover 244 and are received in tapped openings in the adjacent ends of posts 250 which project from the wall 63 and are secured thereto by any suitable means, such as screws, not shown.

We claim:

1. In mechanism for controlling the pressure in an enclosure: means defining a control pressure chamber having an inlet connection and an outlet connection; a single metering valve controlling one of said connections, said metering valve comprising a pair of movable valve members; pressure responsive means, responsive to the pressure in said control chamber, for controlling one of said movable valve members of said metering valve so as to maintain a substantially constant pressure within said control chamber; differential pressure responsive means responsive to variations in the differential of pressure between that in the control chamber and a pressure exterior to said control chamber for controlling the other of said movable valve members of said metering valve so as to maintain the pressure in said control chamber at a predetermined fixed differential pressure with respect to said exterior pressure; and means for varying the response of said differential pressure responsive means.

2. In mechanism for controlling the pressure within an enclosure, including: an outflow valve for controlling the escape of air from said enclosure, said valve comprising a pressure sensitive element; means defining a control pressure chamber having a connection with a source of higher pressure and a connection with a region of lower pressure, said pressure sensitive element being subjected on one side to enclosure pressure and on the opposite side to control pressure; means for controlling the pressure within said control pressure chamber, including metering valve means having a series of cooperating parts controlling the connection with the region of lower pressure; absolute pressure responsive means, responsive to the pressure within the control chamber, for controlling one of the parts of the metering valve; differential pressure responsive means, responsive to variations in the differential of pressure between that in the control chamber and the pressure exterior to the enclosure, for controlling the other of said metering valve parts; and means for changing the response of said differential pressure responsive means at a predetermined rate.

3. Pressure control mechanism, comprising: means defining a control pressure chamber having an inlet and an outlet; a metering valve means for controlling the escape of air from said air control pressure chamber, said metering valve means including a valve seat member and a metering pin cooperable therewith; a rocker arm pivoted intermediate its ends and having one end operably connected with the metering pin; absolute pressure responsive means connected with said rocker arm at the side of the pivot opposite the said end; yielding means connected with said rocker arm adjacent the opposite end thereof for urging the metering pin in a set direction; means limiting the movement of the rocker arm in both directions but permitting limited movement; means for manually varying the effective force of said yielding means; indicator means connected with the manually operable varying means to indicate the pressure level for the control pressure chamber effected by the absolute pressure responsive means; differential pressure responsive means, responsive to variations in the differential of pressure between that in the control pressure chamber and ambient atmosphere, said differential means controlling the position of the metering valve seat member; a lever pivoted adjacent one end and carrying the valve seat member; spaced means for limiting the movement of the opposite end of said lever; yielding means urging the seat member toward the said pin; reversible electrical means for varying the effective force of the last mentioned yielding means; electrical circuits for said electrical means for the respective directions of operation, each of said circuits including a normally closed limit switch; selector switch means for effecting responsive movement of the electrical means; indicator means connected with the electrical means for indicating the responsive differential pressure levels desired; and cam means connected with the indicator means for controlling the limit switches to effect stopping of the operation of the electrical means when the desired pressure differential has been reached.

4. Means for controlling the pressure in the control chamber of a pressure regulating mechanism, comprising: a metering valve for controlling the flow of fluid relative to said chamber, said metering valve comprising a pair of movable valve members; absolute pressure responsive means controlling one of said movable valve members of said metering valve; differential pressure responsive means controlling the other of said movable valve members of said metering valve; and means operated at a substantial constant predetermined rate for changing the response of said differential pressure responsive means.

5. In pressure control mechanism: means defining a controlled pressure chamber; means for controlling the flow of fluid relative to said chamber including a metering valve having a valve pin and a valve seat; absolute pressure responsive means responsive to the pressure in said control chamber for controlling the valve pin; differential pressure responsive means including a pressure sensitive element responsive to variations in the differential of pressure between that in the control chamber and pressure external of said control chamber, said pressure sensitive element having the valve seat attached thereto; spring means loading said pressure sensitive element and determining the response characteristics thereof; power operated means for varying the effective force of said spring means; means for limiting the operation of said power operated means; and means for adjusting the limiting means.

6. In pressure control mechanism: means defining a controlled pressure chamber; means for controlling the flow of fluid relative to said chamber including a metering valve having a valve pin and a valve seat; absolute pressure responsive means responsive to the pressure in said control chamber for controlling the valve pin; differential pressure responsive means including a pressure sensitive element responsive to variations in the differential of pressure between that in the control chamber and pressure external of said control chamber, said pressure sensitive element having the valve seat attached thereto; spring means loading said pressure sensitive element and determining the response characteristics thereof; power operated means for varying the effective force of said spring means; and means for limiting the operation of said power operated means.

7. In pressure control mechanism: means defining a controlled pressure chamber; means for controlling the flow of fluid relative to said chamber including a meter-valve having a valve pin and a valve seat; absolute pressure responsive means responsive to the pressure in said control chamber for controlling the valve pin; differential pressure responsive means including a pressure sensitive element responsive to variations in the differential of pressure between that in the control chamber and pressure external of said control chamber, said pressure sensitive element having the valve seat attached thereto; spring means loading said pressure sensitive element and determining the response characteristics thereof; and power operated means for varying the effective force of said spring means.

8. In pressure control mechanism: means defining a control pressure chamber; means for controlling the flow of fluid relative to said chamber including a metering valve having a valve pin and a valve seat; absolute pressure responsive means responsive to the pressure in said control chamber for controlling the valve pin; differential pressure responsive means including a pressure sensitive element responsive to variations in the differential of pressure between that in the control chamber and pressure external of said control chamber, said pressure sensitive element having the valve seat attached thereto; and spring means loading said pressure sensitive element and determining the response characteristics thereof.

9. In pressure control mechanism: a metering valve having a pair of valve members; absolute pressure responsive means controlling one of said metering valve members in one range of operation; differential pressure responsive means for controlling the other of said metering valve members in another range of operation; power actuated means for varying the response characteristics of the differential pressure responsive means between a high differential pressure and a low differential pressure; and means limiting the operation of said power actuated means to predetermine high and low differential values.

10. The invention defined by claim 9, including adjusting means for the limiting means to vary the high and low differential values to predetermined limits.

11. In pressure control mechanism: means defining a control pressure chamber having an inlet connection and an outlet connection; metering valve means for controlling the flow of fluid through one of said connections, said metering valve means including a movable valve pin member and a movable valve seat member; absolute pressure responsive means, subjected to the pressure in said control chamber, controlling one of said valve members and differential pressure responsive means carrying the other of said valve members and controlling the movements thereof.

12. Pressure control mechanism: means defining a control pressure chamber having an inlet connection and an outlet connection; metering valve means for controlling the flow of fluid through one of said connections, said metering valve means comprising a movable valve pin member and a movable seat member; a pivoted lever carrying the valve seat member; spaced stop means for limiting movement of the lever; a lever carrying said valve pin member; absolute pressure responsive means for controlling said lever and hence the valve pin member; and differential pressure responsive means controlling the valve seat member.

13. In mechanism for controlling the pressure in an enclosure: means defining a control pressure chamber having an inlet connection and an outlet connection; a single metering valve controlling one of said connections, said metering valve including a plurality of parts; pressure responsive means, responsive to the pressure in said control chamber, for controlling said metering valve so as to maintain a substantially constant pressure within said control chamber; differential pressure responsive means carrying one of said parts, said differential pressure responsive means being responsive to variations in the differential of pressure between that in the control chamber and a pressure exterior to said control chamber for controlling said metering valve so as to maintain the pressure in said control chamber at a predetermined fixed differential pressure with respect to said exterior pressure; and power operated means for varying the response of said differential pressure responsive means.

14. Means for controlling the pressure in the control chamber of a pressure regulating mechanism, comprising: a metering valve having a plurality of parts for controlling the flow of fluid relative to said chamber; absolute pressure responsive means controlling one of said parts of said metering valve; differential pressure responsive means controlling the other of said metering valve parts; and means operated at a substantially constant predetermined rate for changing the response of said differential pressure responsive means.

15. In a pressure control mechanism having a control pressure chamber: a metering valve for controlling the flow of fluid relative to said chamber, said metering valve having a plurality of movable parts; absolute pressure responsive means controlling one of the parts of said metering valve in one range of operation; differential pressure responsive means for controlling another of the parts of said metering valve in another range of operation; power actuated means for varying the response characteristics of said differential pressure responsive means between a high differential pressure and a low differential pressure; and means limiting the operation of said power actuated means to predetermined high and low differential values.

16. In mechanism for controlling the pressure in an enclosure: means defining a control pressure chamber; a metering valve for controlling the flow of fluid relative to said chamber to thereby control the pressure therein; absolute pressure responsive means for controlling said metering valve; differential pressure responsive means for controlling said metering valve; fixed stop means limiting effective operation of said differential pressure responsive means in both directions; and means for varying the responsive characteristics of said differential responsive means, including electrical motor means.

17. In mechanism for controlling the pressure in an enclosure: means defining a control pressure chamber; a metering valve for controlling the flow of fluid relative to said chamber to thereby control the pressure therein; absolute pressure responsive means for controlling said metering valve; differential pressure responsive means for controlling said metering valve; means limiting the effective operation of said differential pressure responsive means in both directions; means for varying the response characteristics of said differential responsive means, including electrical motor means; and means for limiting the operation of said electrical motor.

18. In mechanism for controlling the pressure in an enclosure: means defining a control pressure chamber; a metering valve for controlling the flow of fluid relative to said chamber to thereby control the pressure therein; absolute pressure responsive means for controlling said metering valve; differential pressure responsive means for controlling said metering valve; means limiting the effective operation of said differential pressure responsive means in both directions; means for varying the response characteristics of said differential pressure responsive means, including a reversible electric motor adapted to operate at a substantially constant rate of speed; means including electrical switches, limiting the operation of the motor in both directions; and means for adjusting the duration of operation of the motor in either direction.

19. In a pressure control mechanism: means defining a control pressure chamber having an inlet connection and an outlet connection; metering valve means for controlling the outlet connection, said metering valve means including a movable valve member and a movable valve seat member; an evacuated bellows subjected exteriorly to the pressure in the control chamber, controlling one of said valve members and differential pressure responsive means carrying the other of said valve members and controlling the movements thereof, said differential pressure responsive means being subjected to one side to the pressure in said control chamber and on the opposite side to a pressure exterior of said control chamber.

20. In pressure control mechanism: a pilot valve comprising a plurality of movable valve members; absolute pressure responsive means controlling one of said valve members of said pilot valve in one range of operation; differential pressure responsive means for controlling the other valve member of said pilot valve in another range of operation; power actuated means for controlling the response characteristics of the differential pressure responsive means; and means limiting the operation of said power actuated means to provide predetermined high and low differential pressure limits.

References Cited in the file of this patent

UNITED STATES PATENTS

| | | |
|---|---|---|
| 2,463,487 | Widgery et al. | Mar. 1, 1949 |
| 2,463,490 | Kemper | Mar. 1, 1949 |
| 2,463,491 | Kemper | Mar. 1, 1949 |
| 2,484,846 | Paget | Oct. 18, 1949 |
| 2,513,332 | Kemper | July 4, 1950 |
| 2,578,773 | Arthur | Dec. 18, 1951 |
| 2,610,564 | Cooper et al. | Sept. 16, 1952 |
| 2,621,577 | Cooper et al. | Dec. 16, 1952 |
| 2,696,153 | Kemper | Dec. 7, 1954 |